(12) United States Patent
Kato

(10) Patent No.: US 11,039,292 B2
(45) Date of Patent: Jun. 15, 2021

(54) IMAGE ACQUISITION DEVICE CAPABLE OF ACQUIRING IMAGES REGARDLESS OF COMMUNICATION STATE, IMAGE ACQUISITION METHOD, RECORDING MEDIUM, IMAGE ACQUISITION SYSTEM, IMAGING DEVICE, AND IMAGING

(71) Applicant: CASIO COMPUTER CO., LTD., Tokyo (JP)

(72) Inventor: Yoshiyuki Kato, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 238 days.

(21) Appl. No.: 15/879,837

(22) Filed: Jan. 25, 2018

(65) Prior Publication Data

US 2018/0262892 A1 Sep. 13, 2018

(30) Foreign Application Priority Data

Mar. 7, 2017 (JP) .............................. JP2017-042307

(51) Int. Cl.
*H04W 4/80* (2018.01)
*H04W 4/70* (2018.01)
*H04N 5/232* (2006.01)
*H04N 5/247* (2006.01)
*H04W 76/10* (2018.01)
(Continued)

(52) U.S. Cl.
CPC ................ *H04W 4/80* (2018.02); *G03B 7/08* (2013.01); *H04N 5/23216* (2013.01); *H04N 5/23238* (2013.01); *H04N 5/23245* (2013.01); *H04N 5/232933* (2018.08); *H04N 5/232939* (2018.08); *H04N 5/247* (2013.01); *H04W 4/70* (2018.02); *G03B 17/02* (2013.01); *H04W 56/001* (2013.01); *H04W 76/10* (2018.02)

(58) Field of Classification Search
CPC ..... H04W 4/80; H04W 56/001; H04W 76/10; H04W 4/70; G03B 7/08; G03B 17/02
USPC ................................. 348/61, 262; 396/56–59
See application file for complete search history.

(56) References Cited

U.S. PATENT DOCUMENTS

2008/0211941 A1* 9/2008 Deever ................ H04N 5/2258
348/262
2011/0025853 A1* 2/2011 Richardson ............ H04N 5/247
348/159
(Continued)

FOREIGN PATENT DOCUMENTS

JP          06165009 A    6/1994
JP       2004193702 A    7/2004
JP          4437121 B2   3/2010

*Primary Examiner* — Xi Wang
(74) *Attorney, Agent, or Firm* — Holtz, Holtz & Volek PC

(57) ABSTRACT

The present invention is to surely acquire an image of a part according to an instruction from a video regardless of presence or absence of communication connection and a communication state. A controller unit acquires instruction information (log) as instruction information to acquire an image, where the instruction information corresponds to time information related to time to acquire the image, and acquires an image of a temporal part indicated by the time information corresponding to the instruction information, from each of plural videos recorded continuously in terms of time, synchronized with the time information corresponding to the acquired instruction information, and different in content from one another.

11 Claims, 6 Drawing Sheets

(51) Int. Cl.
*G03B 7/08* (2021.01)
*H04W 56/00* (2009.01)
*G03B 17/02* (2021.01)

(56) References Cited

U.S. PATENT DOCUMENTS

| | | | |
|---|---|---|---|
| 2014/0028816 A1* | 1/2014 | Brockway, III | H04L 12/2803 348/61 |
| 2015/0103196 A1* | 4/2015 | Shin | H04N 5/23203 348/211.1 |
| 2016/0111128 A1* | 4/2016 | Nowak | H04N 5/23206 386/219 |
| 2017/0263285 A1* | 9/2017 | Yabuki | G06K 9/00765 |

* cited by examiner

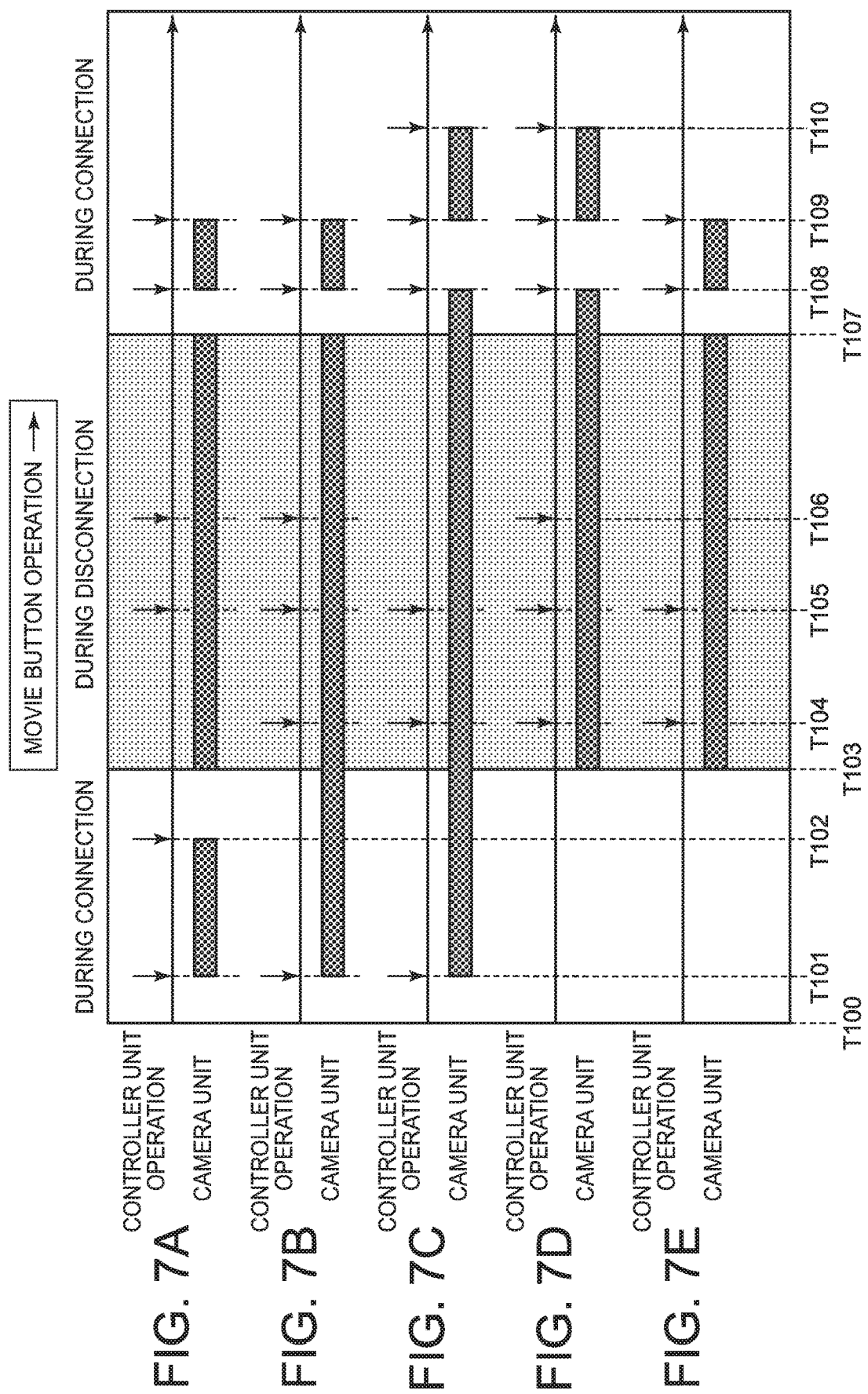

IMAGE ACQUISITION DEVICE CAPABLE OF ACQUIRING IMAGES REGARDLESS OF COMMUNICATION STATE, IMAGE ACQUISITION METHOD, RECORDING MEDIUM, IMAGE ACQUISITION SYSTEM, IMAGING DEVICE, AND IMAGING

CROSS-REFERENCE TO RELATED APPLICATION

This application is based upon and claims the benefit of priority from the prior Japanese Patent Application No. 2017-042307, filed Mar. 7, 2017, the entire contents of which are incorporated herein by reference.

BACKGROUND OF THE INVENTION

1. Field of the Invention

The present invention relates to an image acquisition device capable of acquiring images regardless of a communication state, an image acquisition method, a recording medium, an image acquisition system, an imaging device, and an imaging method.

2. Description of the Related Art

Conventionally, a technique has been disclosed, which records an operation history in which editing operations are performed on a video shot with a camcorder, and can play back the video shot or reproduce editing processing based on the operation history (for example, see Japanese Patent Application Laid-Open No. 2004-193702).

SUMMARY OF THE INVENTION

One aspect of an image acquisition device according to the present invention includes:

an instruction information acquiring section which acquires instruction information used to acquire an image, where the instruction information corresponds to time information related to time to acquire the image; and a part acquisition section which acquires an image of a temporal part indicated by the time information corresponding to the instruction information, from each of a plurality of videos recorded continuously in terms of time, synchronized with the time information corresponding to the instruction information acquired by the instruction information acquiring section, and different in content from one another.

Further, one aspect of an image acquisition method according to the present invention includes:

an instruction information acquiring process of acquiring instruction information used to acquire an image, where the instruction information corresponds to time information related to time to acquire the image; and a part acquisition process of acquiring an image of a temporal part indicated by the time information corresponding to the instruction information, from each of a plurality of videos recorded continuously in terms of time, synchronized with the time information corresponding to the instruction information acquired in the instruction information acquiring process, and different in content from one another.

Further, one aspect of a recording medium according to the present invention stores a program which causes a computer to implement:

an instruction information acquiring function of acquiring instruction information used to acquire an image, where the instruction information corresponds to time information related to time to acquire the image; and a part acquisition function of acquiring an image of a temporal part indicated by the time information corresponding to the instruction information, from each of a plurality of videos recorded continuously in terms of time, synchronized with the time information corresponding to the instruction information acquired by the instruction information acquiring function, and different in content from one another.

Further, one aspect of an image acquisition system according to the present invention is an image acquisition system including an image acquisition device and a plurality of imaging devices, wherein the image acquisition device includes an instruction information acquiring section which acquires instruction information used to acquire an image, where the instruction information corresponds to time information related to time to acquire the image, each of the plurality of imaging devices includes a sending section which sends a video continuously shot in terms of time and synchronized with the time information corresponding to the instruction information acquired by the instruction information acquiring section, and the image acquisition device further includes a part acquisition section which acquires an image of a temporal part indicated by the time information corresponding to the instruction information acquired by the instruction information acquiring section, from the video sent from each of the plurality of imaging devices.

Further, one aspect of an imaging device according to the present invention includes:

a shooting control section which controls video shooting with an imaging section according to shooting instruction information received from an external device through communication; and a communication state detecting section which detects a communication state with the external device, wherein the shooting control section controls the imaging section to perform the video shooting continuously regardless of the shooting instruction information from the external device while the communication state is detected by the communication state detecting section as a disconnected state, and the imaging device further includes:

an instruction information acquiring section which acquires, after being connected, the shooting instruction information that has not been received while the communication state is detected by the communication state detecting section as the disconnected state; and a part identification section which identifies a temporal part, corresponding to the shooting instruction information acquired by the instruction information acquiring section, from a video shot with the imaging section when the communication state is the disconnected state.

Further, one aspect of an imaging method according to the present invention includes:

a shooting control process of controlling video shooting with an imaging section according to shooting instruction information received from an external device through communication; and a communication state detecting process of detecting a communication state with the external device, wherein the imaging section is controlled in the shooting control process to perform the video shooting continuously regardless of the shooting instruction information from the external device while the communication state is detected as a disconnected state in the communication state detecting process, and the imaging method further includes:

an instruction information acquiring process of acquiring, after being connected, the shooting instruction information that has not been received while the communication state is detected in the communication state detecting process as the disconnected state; and a part identification process of identifying a temporal part corresponding to the shooting instruction information acquired in the instruction information acquiring process, from a video shot with the imaging section when the communication state is the disconnected state.

Further, one aspect of a recording medium according to the present invention stores a program which causes a computer to implement:

a shooting control function of controlling video shooting with an imaging section according to shooting instruction information received from an external device through communication; and a communication state detecting function of detecting a communication state with the external device, wherein the shooting control function controls the imaging section to perform the video shooting continuously regardless of the shooting instruction information from the external device while the communication state is detected by the communication state detecting function as a disconnected state, and the program causes the computer to further implement:

an instruction information acquiring function of acquiring, after being connected, the shooting instruction information that has not been received while the communication state is detected by the communication state detecting function as the disconnected state; and a part identification function of identifying a temporal part corresponding to the shooting instruction information acquired by the instruction information acquiring function, from a video shot with the imaging section when the communication state is the disconnected state.

Further, one aspect of an image acquisition system according to the present invention is an image acquisition system including an image acquisition device and a plurality of imaging devices, wherein each of the plurality of imaging devices includes:

a shooting control section which controls video shooting with an imaging section according to shooting instruction information received from the image acquisition device through communication; and a communication state detecting section which detects a communication state with the image acquisition device, the shooting control section controls the imaging section to perform the video shooting continuously regardless of the shooting instruction information from the image acquisition device while the communication state is detected by the communication state detecting section as a disconnected state, the imaging device further includes:

an instruction information acquiring section which acquires, after being connected, the shooting instruction information that has not been received while the communication state is detected by the communication state detecting section as the disconnected state; and a part identification section which identifies a temporal part corresponding to the shooting instruction information acquired by the instruction information acquiring section, from a video shot with the imaging section while the communication state is detected as the disconnected state, and the image acquisition device includes an image acquisition section which acquires an image of a temporal part corresponding to the shooting instruction information identified by the identification section, from each of the plurality of imaging devices.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7A to FIG. 7E are timing charts illustrating image data acquisition patterns A to E in a multi-connection camera system according to Embodiment 2.

DETAILED DESCRIPTION OF THE INVENTION

Specific modes of the present invention will be described below with reference to the accompanying drawings. Note, however, that the scope of the invention is not limited to the illustrated examples.

Embodiment 1

Figure 1:
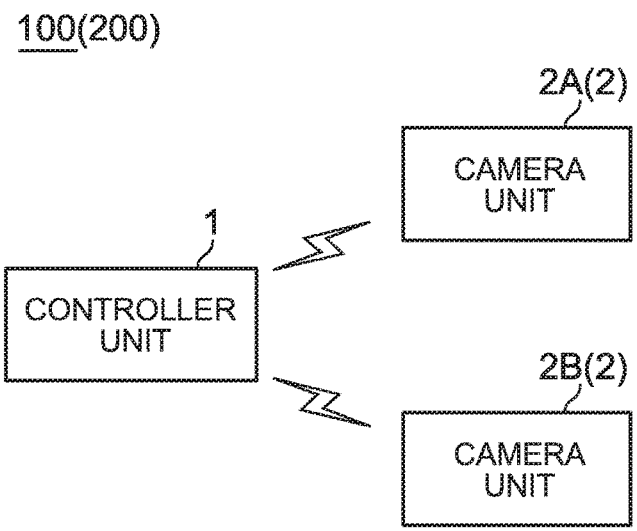
FIG. 1 is a diagram illustrating a schematic configuration of a multi-connection camera system in Embodiment 1 to which the present invention is applied.

FIG. 1 is a diagram illustrating a schematic configuration of a multi-connection camera system (image acquisition system) 100 of Embodiment 1 to which the present invention is applied.

As illustrated in FIG. 1, the multi-connection camera system 100 of the embodiment includes a controller unit (image acquisition device) 1 which performs synchronous type wireless communication (such as Bluetooth (registered trademark), or the like), and plural camera units (imaging device) 2, . . . (in FIG. 1, two camera units 2A and 2B are illustrated). In the following, the plural camera units 2, . . . will be described as the two camera units 2A and 2B.

Each of the camera units 2A and 2B has an independent housing body (not illustrated) and is capable of shooting independently in a separated state. Further, the camera units 2A and 2B can be integrated in such a state that the camera units 2A and 2B are arranged to make each other's optical axes common and make each other's lens surfaces face in opposite directions, i.e., in such a state that the camera units 2A and 2B are arranged back to back. Here, each of the camera units 2A and 2B is equipped with a so-called circumferential fish-eye lens so that, when being integrated, the camera units 2A and 2B can perform so-called omnidirectional shooting. Note that the omnidirectional shooting can be performed by operating a predetermined button equipped in the controller unit 1 and setting an "omnidirectional shooting" mode on a shooting mode setting screen.

Note that an electric/mechanistic determination section capable of determining whether the camera units 2A and 2B are integrated or not is so provided that, when the determination section determines that both are integrated, the "omnidirectional shooting" mode may be automatically set to acquire images of the same temporal parts from the respective camera units 2A and 2B, while when the determination section does not determine that both are integrated, images of different temporal parts may be acquired from the camera units 2A and 2B, respectively.

Further, in a state where each of the camera units 2A and 2B performs shooting continuously (hereinafter called "all shooting"), when a shooting instruction is given with a user's operation in the controller unit 1, the multi-connection camera system 100 of the embodiment associates the shooting instruction with the operation time of the user's operation related to the shooting instruction, and records them as a log on a recording medium 105a. Then, after completion of the all shooting with each of the camera units 2A and 2B, when a communication connection is established between the controller unit 1 and each of the camera units 2A and 2B, the multi-connection camera system 100 has the function of acquiring, from an all shot video, image data on a part (temporal part) corresponding to the log.

First, the controller unit 1 will be described with reference to FIG. 2.

Figure 2:
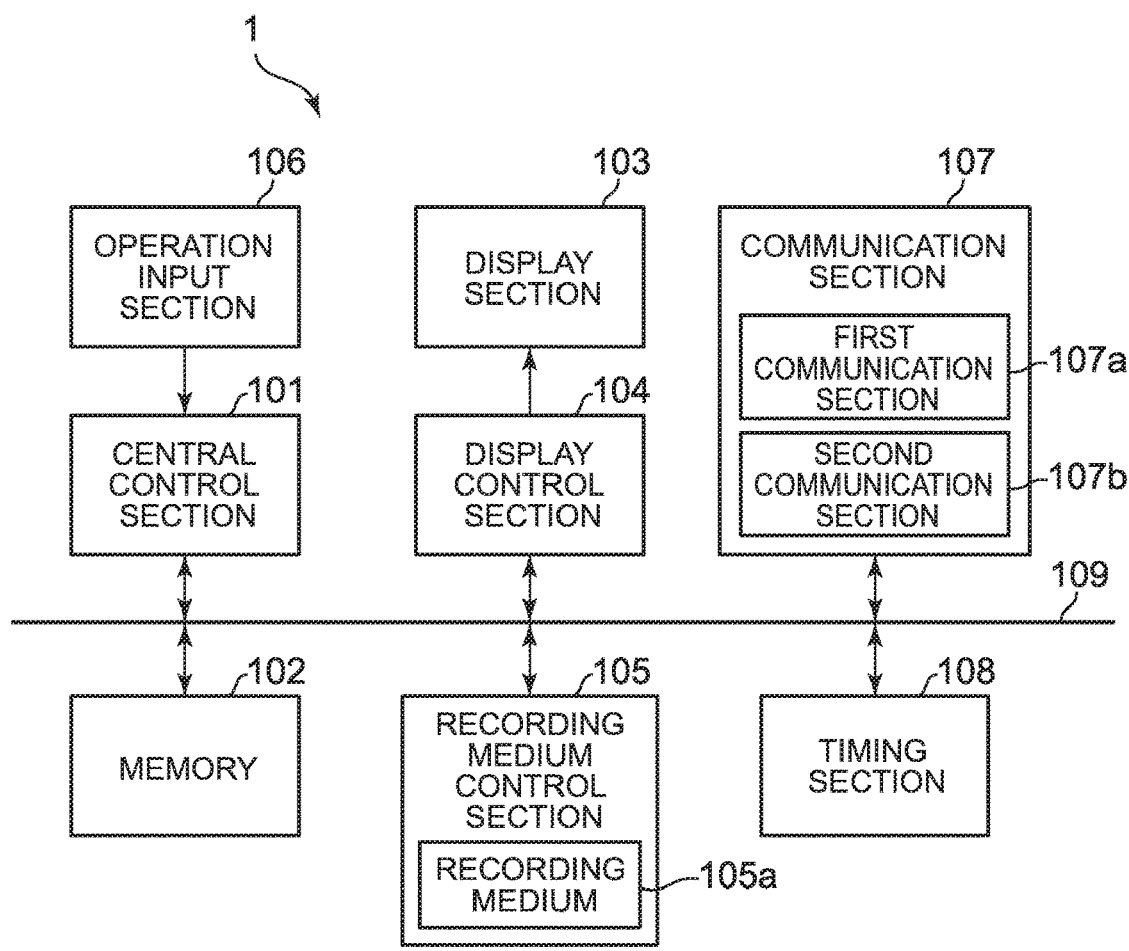
FIG. 2 is a block diagram illustrating a schematic configuration of a controller unit that constitutes part of the multi-connection camera system of FIG. 1.

FIG. 2 is a block diagram illustrating a schematic configuration of the controller unit 1.

The controller unit 1 becomes a master in synchronous type wireless communication with a device (e.g., the camera unit 2A) as a control target. Specifically, as illustrated in FIG. 2, the controller unit 1 includes a central control section 101, a memory 102, a display section 103, a display control section 104, a recording medium control section 105, an operation input section 106, a communication section 107, and a timing section 108.

The central control section 101, the memory 102, the display control section 104, the recording medium control section 105, the communication section 107, and the timing section 108 are connected through a bus line 109.

For example, the controller unit 1 may be a dedicated device compatible with the camera units 2A and 2B, or a mobile phone, a smartphone, or a PDA (Personal Data Assistant).

The central control section (instruction information acquiring section, part acquisition section, identification section, instruction information recording section, image acquisition section) 101 controls each section of the controller unit 1. Specifically, the central control section 101 includes a CPU (Central Processing Unit) and the like, not illustrated, to perform various control operations according to various processing programs (not illustrated) for the controller unit 1.

The memory 102 is, for example, a DRAM (Dynamic Random Access Memory), or the like, to temporarily store data processed by the central control section 101, and the like.

The display section 103 is, for example, equipped with an LCD, or the like, to display various pieces of information in a display area under the control of the central control section 101. Specifically, for example, the display section 103 displays, in the display area, an application screen (such as a live-view image display screen or a remote-control screen) according to image signal output from the display control section 104.

Based on the execution of each of various application programs (such as a live-view image display program, a remote-control program, and the like, which are not illustrated) by the central control section 101, the display control section 104 generates the application screen and outputs, to the display section 103, an image signal according to the generated application screen.

The recording medium 105a is loadable into the recording medium control section 105, and the recording medium control section 105 controls reading data from the loaded recording medium 105a and writing data to the recording medium 105a.

In other words, for example, the recording medium control section 105 records, in a predetermined recording area of the recording medium 105a, image data on a still image or a video captured with each of the camera units 2A and 2B, and sent and acquired from this camera unit 2A, 2B by wireless communication.

Note that the recording medium 105a is, for example, a nonvolatile memory (flash memory), or the like.

The operation input section 106 is used to input various instructions to the body of the controller unit 1.

Specifically, for example, the operation input section 106 includes a power button related to power ON/OFF of the body of the controller unit 1, and up, down, right, and left cursor buttons and an OK button related to selection instructions to select modes, functions, and the like (all of which are not illustrated).

Then, when any of various buttons is operated by a user, the operation input section 106 outputs, to the central control section 101, an operation instruction corresponding to the operated button. The central control section 101 causes each section to perform a predetermined operation according to the input operation instruction output from the operation input section 106.

Note that the operation input section 106 may also have a touch panel provided integrally with the display section 103, and based on a predetermined operation on the touch panel by the user, an operation instruction corresponding to the predetermined operation may be output to the central control section 101.

The communication section 107 performs personal wireless communication between the respective camera units 2A and 2B.

Specifically, the communication section 107 includes a first communication section 107a which performs communication on condition that both the controller unit 1 and each of the camera units 2A and 2B are in the power-on state and in a state capable of sending and receiving images at a predetermined speed, and a second communication section 107b which cannot send and receive images at the predetermined speed but can perform communication even when either one of the controller unit 1, and the camera units 2A and 2B is in a sleep state.

The first communication section 107a performs communication in conformity with the standards of Wi-Fi (Wireless Fidelity) (registered trademark).

The second communication section 107b performs communication in conformity with the standards of Bluetooth (registered trademark).

Note that each of the first communication section 107a and the second communication section 107b is composed of an antenna, a demodulation circuit, a signal processing circuit, and the like.

For example, the timing section 108 is configured to include a timer, a timing circuit, and the like to measure current time and acquire time information.

Next, each camera unit 2 will be described with reference to FIG. 3.

Figure 3:
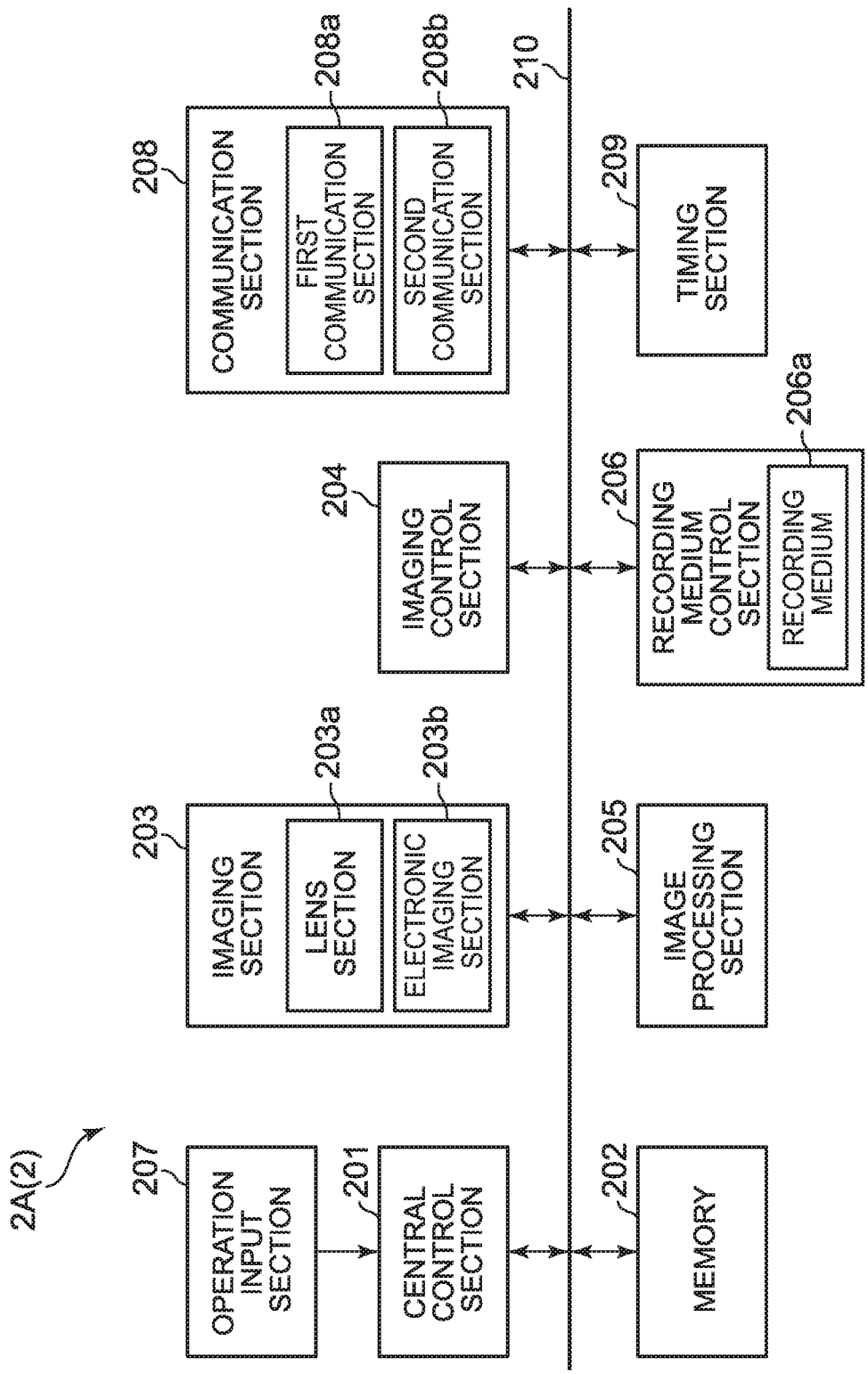
FIG. 3 is a block diagram illustrating a schematic configuration of a camera unit that constitutes part of the multi-connection camera system of FIG. 1.

FIG. 3 is a block diagram illustrating a schematic configuration of the camera unit 2.

Here, the plural camera units 2, . . . become slaves in synchronous type wireless communication with the control device (controller unit 1). Since configuration and operation of the camera units 2, . . . are substantially the same as one another, the description will be made by taking the camera unit 2A as a representative of the camera units 2. Note that all the camera units 2 are not necessarily of the same type.

As illustrated in FIG. 3, the camera unit 2A includes a central control section 201, a memory 202, an imaging section 203, an imaging control section 204, an image processing section 205, a recording medium control section 206, an operation input section 207, a communication section 208, and a timing section 209.

The central control section 201, the memory 202, the imaging section 203, the imaging control section 204, the image processing section 205, the recording medium control section 206, the communication section 208, and the timing section 209 are connected through a bus line 210.

The central control section (communication state detecting section, instruction information acquiring section, part identification section, connection-time state identifying section, disconnection-time state information storing section) 201 controls each section of the camera unit 2A. Specifically, the central control section 201 includes a CPU (Central Processing Unit) and the like, not illustrated, to perform various control operations according to various processing programs (not illustrated) for the camera unit 2A.

The memory 202 is, for example, a DRAM (Dynamic Random Access Memory), or the like, to temporarily store data processed by the central control section 201, and the like.

The imaging section 203 constitutes an imaging section for imaging a subject. Specifically, the imaging section 203 includes a lens section 203a and an electronic imaging section 203b.

The lens section 203a is, for example, composed of a so-called circumferential fish-eye lens, and the like.

The electronic imaging section 203b is, for example, an image sensor, such as a CCD (Charge Coupled Device), a CMOS (Complementary Metal-Oxide Semiconductor), or the like, to convert an optical image passing through the lens of the lens section 203a into a two-dimensional image signal.

Though not illustrated, the imaging section 203 may also include an aperture to adjust the amount of light passing through the lens section 203a.

The imaging control section 204 controls imaging of the subject by the imaging section 203. In other words, the imaging control section 204 includes a timing generator, a driver, and the like, not illustrated. Then, the imaging control section 204 drives the electronic imaging section 203b through the timing generator and the driver to perform scanning, causes the electronic imaging section 203b to convert, to the two-dimensional image signal, the optical image formed every cycle by the lens section 203a, reads a frame image one frame by one frame from an imaging area of the electronic imaging section 203b, and outputs the read frame image to the image processing section 205.

The image processing section 205 generates image data on an image obtained by imaging the subject.

Specifically, after performing gain adjustment on an analog value signal of the frame image transferred from the electronic imaging section 203b appropriately for each of RGB color components, the image processing section 205 samples and holds the analog value signal of the frame image in a sample-and-hold circuit (not illustrated), converts it to digital data in an A/D converter (not illustrated), and performs color process processing including pixel interpolation processing and γ correction processing in a color process circuit (not illustrated) to generate digital values of a luminance signal Y and color-difference signals Cb, Cr (YUV data).

Further, when a live view image is displayed on the controller unit 1, the image processing section 205 generates image data for display of each of frame images that constitute the live view image, and sends the image data to the controller unit 1 through the first communication section 208a.

Further, when the image is recorded, the image processing section 205 compresses YUV data on the subject according to a predetermined coding system (such as JPEG format, motion JPEG format, or MPEG format) and outputs the compressed data to the recording medium control section 206.

The recording medium control section 206 is configured to include a recording medium 206a removably so as to control reading of data from the mounted recording medium 206a and writing of data to the recording medium 206a.

In other words, the recording medium control section 206 records, in a predetermined recording area of the recording medium 206a, recording image data coded by the image processing section 205 in a predetermined compression format (such as JPEG format, motion JPEG format, or MPEG format).

Note that the recording medium 206a is, for example, a nonvolatile memory (flash memory), or the like.

The operation input section 207 is used to perform a predetermined operation on the camera unit 2A.

Specifically, for example, the operation input section 207 includes a power button related to power ON/OFF of the device body, a release button and a movie button related to imaging instructions on a subject, selection and OK buttons related to selection instructions to select modes, functions, and the like (all of which are not illustrated).

Then, when any of various buttons is operated by the user, the operation input section 207 outputs, to the central control section 201, an operation instruction corresponding to the operated button. The central control section 201 causes each section to perform a predetermined operation according to the input operation instruction output from the operation input section 207.

The communication section 208 performs personal wireless communication with the controller unit 1.

Specifically, the communication section 208 has a similar configuration to that of the communication section 107 in the controller unit 1, including a first communication section 208a which performs communication on condition that both the camera unit 2A and the controller unit 1 are in the power-on state and in a state capable of sending and receiving images at a predetermined speed, and a second communication section 208b which cannot send and receive images at the predetermined speed but can perform communication even when either one of the camera units 2A and the controller unit 1 is in a sleep state.

The first communication section (sending section) 208a performs communication in conformity with the standards of Wi-Fi (Wireless Fidelity) (registered trademark).

The second communication section 208b performs communication in conformity with the standards of Bluetooth (registered trademark).

Note that each of the first communication section 208a and the second communication section 208b is composed of an antenna, a demodulation circuit, a signal processing circuit, and the like.

For example, the timing section 209 is configured to include a timer, a timing circuit, and the like to measure current time and acquire the time information.

<Communication Connection>

Next, communication connection between the controller unit 1 and each of the camera units 2A and 2B will be described.

In the multi-connection camera system 100 of the embodiment, for example, communication setting processing called pairing is performed in advance between the controller unit 1 and each of the camera units 2A and 2B to exchange each other's device information and data on authentication keys using wireless signals. After that, for example, when the controller unit 1 and the camera unit 2A are apart from each other in a range where radio waves are not received, the Bluetooth standard communication connection is released, while when both come close to each other in a range where radio waves are received, the Bluetooth standard communication connection is established without performing the communication setting processing each time. Further, the Wi-Fi standard communication settings are also automatically configured by performing the pairing.

In the multi-connection camera system 100 of the embodiment, for example, when image data are acquired from the camera unit 2A, Wi-Fi connection is established after the Bluetooth standard communication connection between the controller unit 1 and the camera unit 2A is established. Then, the controller unit 1 acquires image data from the camera unit 2A through the first communication section 107a. Upon completion of acquisition of the image data from the camera unit 2A, the controller unit 1 disconnects the Wi-Fi connection through the Bluetooth standard communication.

<Securing of Synchronization>

Next, securing of synchronization between the controller unit 1 and each of the camera units 2A and 2B will be described.

In the multi-connection camera system 100 of the embodiment, there is a need to synchronize the controller unit 1 with each of the camera units 2A and 2B before the start of all shooting with each of the camera units 2A and 2B. As the synchronization method, for example, there is a method of synchronizing clocks (real times) between the controller unit 1 and each of the camera units 2A and 2B. In such a case, the start time of all shooting may be different between the camera units 2A and 2B, respectively.

In addition to the method of synchronizing clocks (real times), there is a synchronization method in which timer counting is started simultaneously between the controller unit 1 and each of the camera units 2A and 2B to synchronize both. In such a case, there is no need for the controller unit 1 and each of the camera units 2A and 2B to use the real times.

<All Shooting with Each of Camera Units 2A and 2B>

Next, a method of starting and ending all shooting with each of the camera units 2A and 2B will be described.

When all shooting with each of the camera units 2A and 2B is started, a predetermined operation button (not illustrated) provided in each of the camera units 2A and 2B is operated to start the all shooting. On the other hand, when all shooting with each of the camera units 2A and 2B is ended, a predetermined operation button (not illustrated) provided in each of the camera units 2A and 2B is operated to end the all shooting.

When the Bluetooth standard communication connection is established between the controller unit 1 and each of the camera units 2A and 2B, not only can the all shooting with each of the camera units 2A and 2B be started, but also the all shooting can be ended by remote control from the controller unit 1.

<Shooting Instruction Method>

Next, a shooting instruction method with a user's operation on the controller unit 1 will be described.

For example, when a shooting instruction related to video shooting is given, a toggle type movie button provided in the controller unit 1 is operated at timing desired by the user.

On the other hand, when a shooting instruction related to still image shooting is given, a release button provided in the controller unit 1 is operated at timing desired by the user.

<Log>

Next, a log recorded when a shooting instruction is given will be described.

As described above, when the toggle type movie button provided in the controller unit 1 is operated, "video shooting" indicative of a kind of shooting instruction is associated with the "operation time" at which the user's operation related to the shooting instruction is performed, and recorded as the log on the recording medium 105a. The movie button operations include an ON operation as an instruction operation to start shooting and an OFF operation as an instruction operation to end shooting. However, depending on the kind of shooting instruction mode to be described below, since there may be a case where the end of shooting with the camera unit 2A and the start of shooting with the camera unit 2B correspond to one shooting instruction (for example, in the case of an "exclusive acquisition" mode, see timing T2 in FIG. 5B), information indicative of a distinction between the ON operation and the OFF operation is not recorded.

On the other hand, when the release button provided in the controller unit 1 is operated, "still image shooting" indicative of another kind of shooting instruction is associated with the "operation time" at which the user's operation related to the shooting instruction is performed, and recorded as the log on the recording medium 105a.

<Kinds of Shooting Instruction Modes>

Next, kinds of shooting instruction modes will be described.

Figure 4:
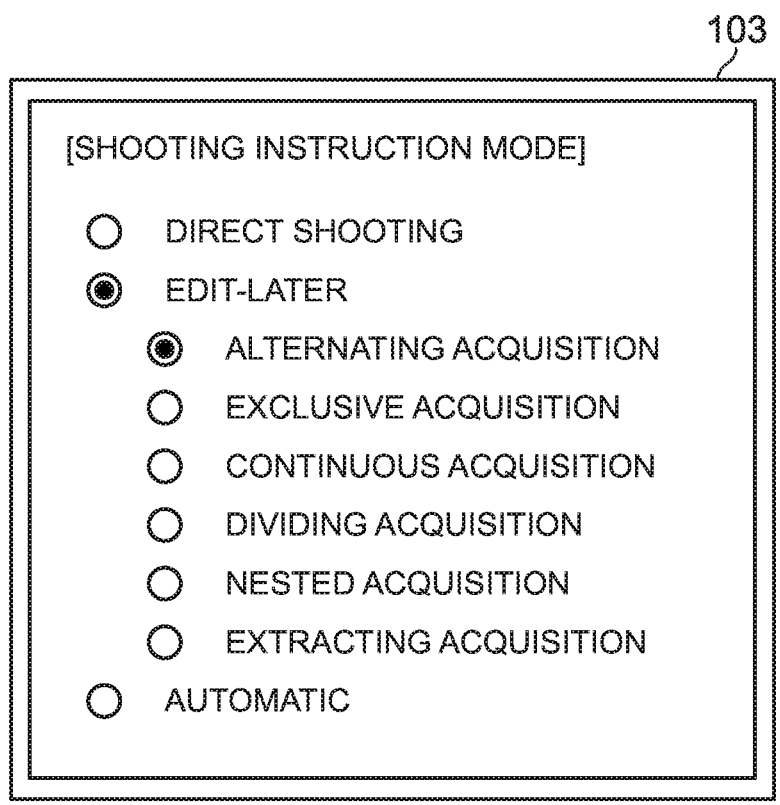
FIG. 4 is a diagram illustrating an example of a selection screen of shooting instruction modes.

FIG. 4 is a diagram illustrating an example of a selection screen for shooting instruction modes, which is displayed on the display section 103 of the controller unit 1.

As illustrated in FIG. 4, three kinds of modes, i.e., "direct shooting" mode, "edit-later" mode, and "automatic" mode, are roughly provided in advance as the shooting instruction modes, and any mode is selectable by operating an option button associated with the mode desired by the user. Each of the modes will be described below.

The "direct shooting" mode is a mode used when the Bluetooth standard communication connection is established between the controller unit 1 and each of the camera units 2A and 2B. In the "direct shooting" mode, when the shooting instruction is given with the user's operation on the controller unit 1, the controller unit 1 identifies either of the camera unit 2A and the camera unit 2B according to the shooting instruction, and performs shooting and recording with the identified camera unit (for example, the camera unit 2A) only for time at which the shooting instruction is given.

The "edit-later" mode is a mode used when the Bluetooth standard communication connection is not established between the controller unit 1 and each of the camera units 2A and 2B (for example, when the "direct shooting" mode cannot be used, or the like). In the "edit-later" mode, when all shooting is performed with each of the camera units 2A and 2B, and during the all shooting, the shooting instruction is given with the user's operation on the controller unit 1, the kind of shooting instruction is associated with the operation time at which the user's operation related to the shooting instruction is performed, and recorded as the log on the recording medium 105a. Then, after completion of the all shooting with each of the camera units 2A and 2B, when the communication connection is established between the controller unit 1 and each of the camera units 2A and 2B, only image data on the temporal part corresponding to the log are acquired from the all shot video.

Further, as illustrated in FIG. 4, six kinds of modes, i.e., an "alternating acquisition" mode, an "exclusive acquisition" mode, a "continuous acquisition" mode, a "dividing acquisition" mode, a "nested acquisition" mode, and an "extracting acquisition" mode, are provided in advance in the "edit-later" mode, and any mode is selectable by operating the option button associated with the mode desired by the user.

Note that the "alternating acquisition" mode, the "exclusive acquisition" mode, the "continuous acquisition" mode, and the "dividing acquisition" mode to be described below are modes for imaging an imaging range different depending on each of the camera units 2A and 2B, for example, and suitable for switching between the camera units as targets to acquire image data according to the moving subject. On the other hand, the "nested acquisition" mode and the "extracting acquisition" mode are modes on the assumption that wide-angle shooting is performed with the camera unit 2A and telephoto shooting with the camera unit 2B is performed on a predetermined range included in the range of imaging with the camera unit 2A.

The "alternating acquisition" mode is a mode for alternately switching between the camera units as targets to acquire image data each time shooting instructions (shooting start instruction and shooting end instruction) related to video shooting are given by the controller unit 1, that is, each time a series of ON/OFF operations of the movie button is performed.

Figure 5:
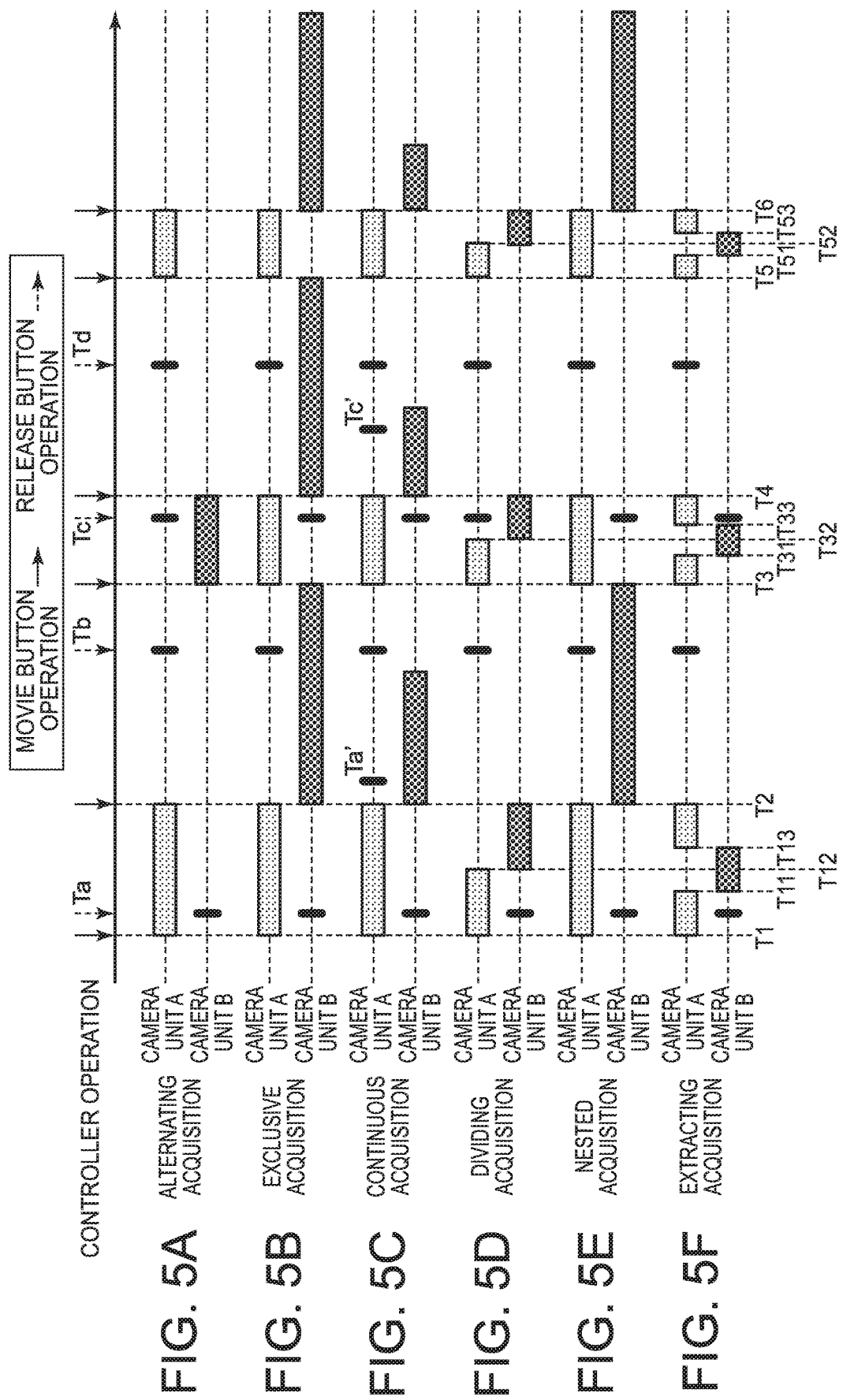
FIG. 5A to FIG. 5F are timing charts illustrating image data acquisition patterns in an "edit-later" mode.

In the case where the "alternating acquisition" mode is set as illustrated in FIG. 5A, for example, when the ON operation of the movie button is performed at timing T1, it means that an instruction to start video shooting with the camera unit 2A (corresponding to camera unit A in FIG. 5A; the same hereinafter) is given. Then, when the OFF operation of the movie button is performed at timing T2, it means that an instruction to end video shooting with the camera unit 2A is given. Next, when the ON operation of the movie button is performed again at timing T3, it means that the instruction to start video shooting with the camera unit 2B (corresponding to camera unit B in FIG. 5A; the same hereinafter) is given. Then, when the OFF operation of the movie button is performed at timing T4, it means that the instruction to end video shooting with the camera unit 2B is given.

In other words, in each of timing periods from T1 to T2, and from T5 to T6, each period's image in a video all shot with the camera unit 2A becomes an acquisition target. On the other hand, in a timing period from T3 to T4, the period's image in the video all shot with the camera unit 2B becomes the acquisition target.

Further, in the case where the "alternating acquisition" mode is set as illustrated in FIG. 5A, for example, when the release button is operated at timings Ta and Tc, images (frame images) at timings Ta and Tc in the video all shot with camera units (the camera unit 2B at timing Ta, and the camera unit 2A at timing Tc), which are not video acquisition targets at timings Ta and Tc, become acquisition targets. Further, when the release button is operated at timings Tb and Td, neither the camera unit 2A nor the camera unit 2B are video acquisition targets at timings Tb and Td. In such a case, images (frame images) at timings Tb and Td in the video all shot with the preset camera unit 2A becomes acquisition targets.

The "exclusive acquisition" mode is a mode where the target to which the shooting instruction related to video shooting is given by the controller unit 1 is the camera unit 2A alone so that the camera unit 2A will be set as an image data acquisition target for a period in which the series of ON/OFF operations of the movie button are performed, while the camera unit 2B will be set as the image data acquisition target for any period other than the period in which the camera unit 2A is set as the image data acquisition target, i.e., for a period from when the OFF operation of the movie button is performed until the ON operation is performed again.

In the case where the "exclusive acquisition" mode is set as illustrated in FIG. 5B, for example, when the ON operation of the movie button is performed at timing T1, it means that the instruction to start video shooting with the camera unit 2A is given. Then, when the OFF operation of the movie button is performed at timing T2, it means that the instruction to end video shooting with the camera unit 2A is given. Similarly, when the ON operation of the movie button is performed at timings T3 and T5, it means that the instruction to start video shooting with the camera unit 2A is given. Then, when the OFF operation of the movie button is performed at timings T4 and T6, it means that the instruction to end video shooting with the camera unit 2A is given.

In other words, in each of timing periods from T1 to T2, from T3 to T4, and from T5 to T6, each period's image in the video all shot with the camera unit 2A becomes the acquisition target. On the other hand, in each of timing periods from T2 to T3 and from T4 to T5, each period's image in the video all shot with the camera unit 2B becomes the acquisition target.

Further, in the case where the "exclusive acquisition" mode is set as illustrated in FIG. 5B, for example, when the release button is operated at timings Ta, Tb, Tc, and Td, images (frame images) at timings Ta, Tb, Tc, and Td in videos all shot with camera units (the camera unit 2B at timings Ta and Tc, and the camera unit 2A at timings Tb and Td), which are not the video acquisition targets at timings Ta, Tb, Tc, and Td, become acquisition targets.

The "continuous acquisition" mode is a mode where the target to which the shooting instruction related to video shooting is given by the controller unit 1 is the camera unit 2A alone so that the camera unit 2A will be set as the image data acquisition target for a period in which the series of ON/OFF operations of the movie button are performed, while the camera unit 2B will be set as the image data acquisition target for any period having the same length as that of the period of the series of ON/OFF operations of the movie button after the OFF operation of the movie button.

In the case where the "continuous acquisition" mode is set as illustrated in FIG. 5C, for example, when the ON operation of the movie button is performed at timing T1, it means that the instruction to start video shooting with the camera unit 2A is given. Then, when the OFF operation of the movie button is performed at timing T2, it means that the instruction to end video shooting with the camera unit 2A is given. Similarly, when the ON operation of the movie button is performed at timings T3 and T5, it means that the instruction to start video shooting with the camera unit 2A is given. Then, when the OFF operation of the movie button is performed at timings T4 and T6, it means that the instruction to end video shooting with the camera unit 2A is given.

In other words, in each of timing periods from T1 to T2, from T3 to T4, and from T5 to T6, each period's image in the video all shot with the camera unit 2A becomes the acquisition target. Then, in each of timing periods, which uses timing T2 as the start point and has the same length as the length of the timing period from T1 to T2, which uses timing T4 as the start point and has the same length as the length of the timing period from T3 to T4, or which uses timing T6 as the start point and has the same length as the length of the timing period from T5 to T6, respectively, each period's image in the video all shot with the camera unit 2B becomes the acquisition target.

Note that a predetermined time (for example, a fixed time or a time corresponding to the length of the period in which the series of ON/OFF operations of the movie button is performed) may be spared before the start of acquisition of image data from the camera unit 2B. Further, the period of setting the camera unit 2A as the image data acquisition target, and the period of setting the camera unit 2B as the image data acquisition target may overlap each other.

Further, in the case where the "continuous acquisition" mode is set as illustrated in FIG. 5C, for example, when the release button is operated at timings Ta and Tc, images (frame images) at timings Ta and Tc in videos all shot with camera units (the camera unit 2B at timing Ta, and the camera unit 2A at timing Tc), which are not video acquisition targets at timings Ta and Tc, become acquisition targets. In such a case, images (frame images) at timings Ta' and Tc' in videos all shot with camera units (the camera unit 2A at timing Ta', and the camera unit 2A at timing Tc'), which are not video acquisition targets at predetermined timings after one camera unit as the video acquisition target is switched to the other at timings T2 and T4 (timing Ta' after the same length of period as the period from timing T1 to timing Ta has elapsed from timing T2, and timing Tc' after the same length of period as the period from timing T3 to timing Tc has elapsed from timing T4).

Further, when the release button is operated at timings Tb and Td, neither the camera unit 2A nor the camera unit 2B are video acquisition targets at timings Tb and Td. In such a case, images (frame images) at timings Tb and Td in the video all shot with the preset camera unit 2A becomes acquisition targets.

The "dividing acquisition" mode is a mode where the period of performing the series of ON/OFF operations of the movie button is so divided that the camera unit 2A will be set as the image data acquisition target in a first half of the period and the camera unit 2B will be set as the image data acquisition target in a second half of the period.

Suppose that the "dividing acquisition" mode is set as illustrated in FIG. 5D. Suppose further that the OFF operation of the movie button is performed at timing T2 after the ON operation of the movie button is performed at timing T1. In this case, in the first half (T1 to T12) of the period from timing T1 to timing T2, the period's image in the video all shot with the camera unit 2A becomes the acquisition target. On the other hand, in the second half (T12 to T2) of the period, the period's image in the video all shot with the camera unit 2B becomes the acquisition target. Similarly, suppose that the OFF operation of the movie button is performed at timing T4 after the ON operation of the movie button is performed at timing T3. In this case, in the first half (T3 to T32) of the period from timing T3 to timing T4, the period's image in the video all shot with the camera unit 2A becomes the acquisition target. On the other hand, in the second half (T32 to T4) of the period, the period's image in the video all shot with the camera unit 2B becomes the acquisition target. Suppose further that the OFF operation of the movie button is performed at timing T6 after the ON operation of the movie button is performed at timing T5. In this case, in the first half (T5 to T52) of the period from timing T5 to timing T6, the period's image in the video all shot with the camera unit 2A becomes the acquisition target. On the other hand, in the second half (T52 to T6) of the period, the period's image in the video all shot with the camera unit 2B becomes the acquisition target.

Note that a predetermined time (for example, a fixed time or a time corresponding to the length of the period in which the series of ON/OFF operations of the movie button is performed) may be spared between the first half period of setting the camera unit 2A as the image data acquisition target and the second half period of setting the camera unit 2B as the image data acquisition target. Further, the first half period of setting the camera unit 2A as the image data acquisition target and the second half period of setting the camera unit 2B as the image data acquisition target may overlap each other.

In the case where the "dividing acquisition" mode is set as illustrated in FIG. 5D, for example, when the release button is operated at timings Ta and Tc, images (frame images) at timings Ta and Tc in the videos all shot with camera units (the camera unit 2B at timing Ta, and the camera unit 2A at timing Tc), which are not video acquisition targets at timings Ta and Tc, become acquisition targets. Further, when the release button is operated at timings Tb and Td, neither the camera unit 2A nor the camera unit 2B are video acquisition targets at timings Tb and Td. In such a case, images (frame images) at timings Tb and Td in the video all shot with the preset camera unit 2A becomes acquisition targets.

The "nested acquisition" mode is a mode where the target to which the shooting instruction related to video shooting is given by the controller unit 1 is the camera unit 2A alone so that the camera unit 2A will be set as the image data acquisition target for periods, i.e., a first period of performing the series of ON/OFF operations of the movie button, and a second period of performing the series of ON/OFF operations of the movie button again, respectively, while the camera unit 2B will be set as the image data acquisition target for a period between the first period and the second period.

In the case where the "nested acquisition" mode is set as illustrated in FIG. 5E, for example, when the OFF operation of the movie button is performed at timing T2 after the ON operation of the movie button is performed at timing T1, the image in the first period from timing T1 to timing T2 in the video all shot with the camera unit 2A becomes the acquisition target. Then, when the OFF operation of the movie button is performed at timing T4 after the ON operation of the movie button is performed again at timing T3, the image in the second period from timing T3 to timing T4 in the video all shot with the camera unit 2A becomes the acquisition target. Then, in a period (T2 to T3) between the first period and the second period, the period's image in the video all shot with the camera unit 2B becomes the acquisition target.

Note that the targets to which the shooting instructions related to video shooting is given by the controller unit 1 are regarded as multistep toggle type ON/OFF operations to both the camera unit 2A and the camera unit 2B so that, after the ON operation to the camera unit 2A and the ON operation to the camera unit 2B, the order of a series of operations of the movie button will be reversed to the OFF operation to the camera unit 2B and the OFF operation of the camera unit 2A, thus nesting the ON/OFF operations to the camera unit 2B in the ON/OFF operations to the camera unit 2A.

In the case where the "nested acquisition" mode is set as illustrated in FIG. 5E, for example, when the release button is operated at timings Ta, Tb, and Tc, images (frame images) at timings Ta, Tb, and Tc in videos all shot with camera units (the camera unit 2B at timings Ta and Tc, and the camera unit 2A at timing Tb), which are not the video acquisition targets at timing Ta, Tb, and Tc, respectively, become acquisition targets. Further, when the release button is operated at timing Td, neither the camera unit 2A nor the camera unit 2B are the video acquisition targets at timing Td. In such a case, an image (frame image) at timing Td in the video all shot with the preset camera unit 2A becomes the acquisition target.

The "extracting acquisition" mode is a mode where the target to which the shooting instruction related to video shooting is given by the controller unit 1 is the camera unit 2A alone so that the camera unit 2B will be set as the image data acquisition target for a predetermined period in the middle of a period in which a series of ON/OFF operations of the movie button is performed, while the camera unit 2A will be set as the image data acquisition target for periods other than the predetermined period in the middle of the period.

In the case where the "extracting acquisition" mode is set as illustrated in FIG. 5F, for example, when the OFF operation of the movie button is performed at timing T2 after the ON operation of the movie button is performed at timing T1, for the predetermined period (for example, T11 to T13) in the middle of the period between timings T1 and T2, the period's image in the video all shot with the camera unit 2B becomes the acquisition target. On the other hand, for periods (for example, T1 to T11 and T13 to T2) other than the predetermined period in the middle of the period between timings T1 and T2, the periods' images in the video all shot with the camera unit 2A become the acquisition targets. Similarly, when the OFF operation of the movie button is performed at timing T4 after the ON operation of the movie button is performed at timing T3, for the predetermined period (for example, T31 to T33) in the middle of the period between timings T3 and T4, the period's image in the video all shot with the camera unit 2B becomes the acquisition target. On the other hand, for periods (for example, T3 to T31 and T33 to T4) other than the predetermined period in the middle of the period between timings T3 and T4, the periods' images in the video all shot with the camera unit 2A become the acquisition targets. Further, when the OFF operation of the movie button is performed at timing T6 after the ON operation of the movie button is performed at timing T5, for the predetermined period (for example, T51 to T53) in the middle of the period between timings T5 and T6, the period's image in the video all shot with the camera unit 2B becomes the acquisition target. On the other hand, for periods (for example, T5 to T51 and T53 to T6) other than the predetermined period in the middle of the period between timings T5 and T6, the periods' images in the video all shot with the camera unit 2A become the acquisition targets.

Further, in the case where the "extracting acquisition" mode is set as illustrated in FIG. 5F, for example, when the release button is operated at timings Ta and Tc, images (frame images) at timings Ta and Tc in the video all shot with the camera unit 2B, which is not the video acquisition target, become the acquisition targets. Further, when the release button is operated at timings Tb and Td, neither the camera unit 2A nor the camera unit 2B are the video acquisition targets at timings Tb and Td. In such a case, images (frame images) at timings Tb and Td in the video all shot with the preset camera unit 2A become the acquisition targets.

The "automatic" mode is a mode used when a camera unit (for example, the camera unit 2A) whose Bluetooth standard communication connection with the controller unit 1 is established, and a camera unit (for example, the camera unit 2B) without any communication connection are mixed. In the "automatic" mode, the "direct editing" mode and the "edit-later" mode are used for each camera unit depending on the status of the Bluetooth standard communication connection with the controller unit 1. Specifically, when the "automatic" mode is set, each of the camera units 2A and 2B performs all shooting like in the "edit-later" mode until the shooting instruction is received from the controller unit 1 through the second communication section 208b. Then, when the shooting instruction is received from the controller unit 1 through the second communication section 208b, each of the camera units 2A and 2B performs shooting and recording only for time during which the shooting instruction is given with the user's operation on the controller unit 1 after the shooting instruction is received like in the "direct shooting" mode.

<Acquisition of Image Data>

Next, the acquisition of image data by the controller unit 1 will be described.

When the controller unit 1 is caused to acquire image data on a video shot with each of the camera units 2A and 2B, the acquisition of image data is started by the user operating a predetermined button on the controller unit 1 in such a state that the communication connection is established between the controller unit 1 and each of the camera units 2A and 2B.

Note that when the "edit-later" mode is set, the acquisition of image data on the all shot video may be started automatically by using, as a trigger, the establishment of communication connection between the controller unit 1 and each of the camera units 2A and 2B after completion of the all shooting with each of the camera units 2A and 2B.

Next, partial image acquisition processing performed in the multi-connection camera system 100 of the embodiment will be described. Note that the partial image acquisition processing is processing performed when the communication connection is established between the controller unit 1 and each of the camera units 2A and 2B after completion of all shooting with each of the camera units 2A and 2B in the "edit-later" mode described above.

Figure 6:
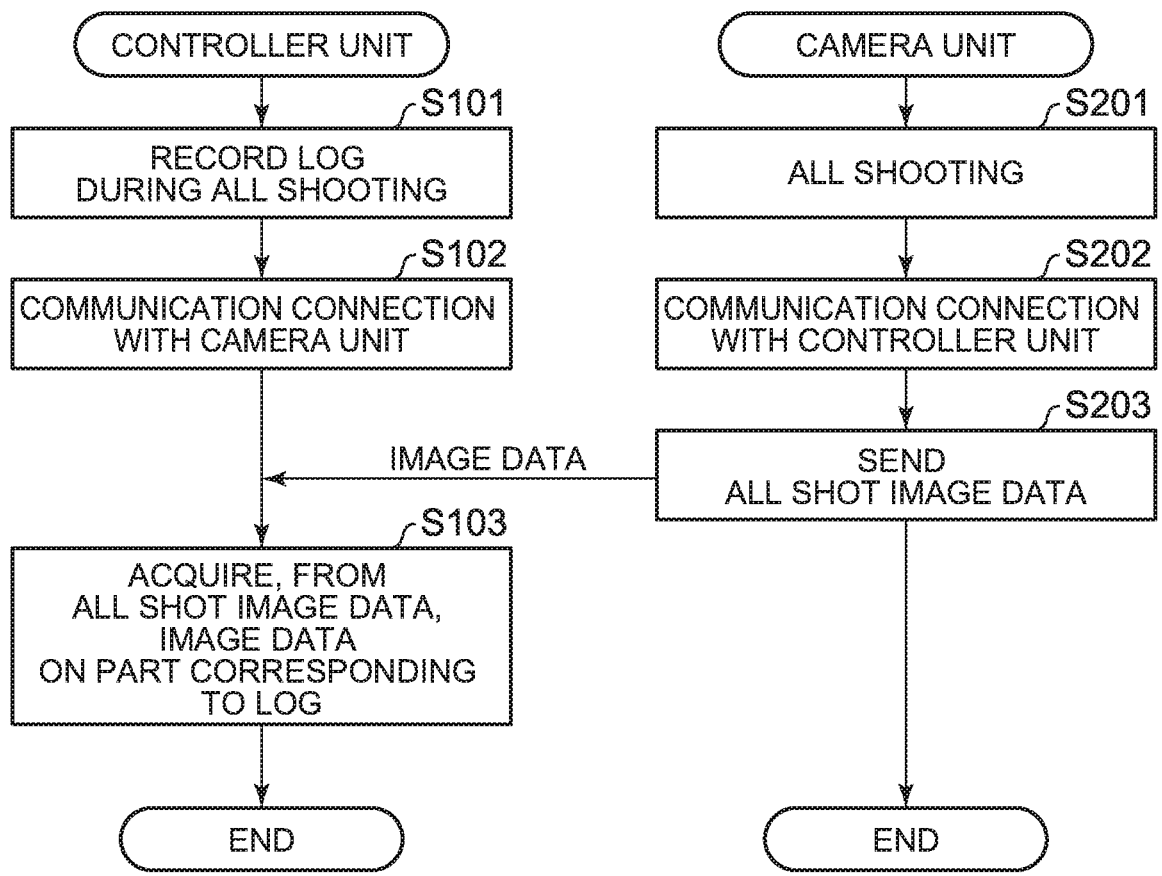
FIG. 6 is a sequence diagram illustrating an example of operation related to partial image acquisition processing in the multi-connection camera system of FIG. 1.

FIG. 6 is a sequence diagram illustrating an example of the partial image acquisition processing.

As illustrated in FIG. 6, each of the camera units 2A and 2B first performs all shooting (step S201), and records, on the recording medium 105*a*, the log each time the shooting instruction is given with the user's operation on the controller unit 1 during the all shooting (step S101).

Next, after completion of the all shooting with each of the camera units 2A and 2B, the communication connection is made through the second communication section 107*b* of the controller unit 1 and the second communication section 208*b* of each of the camera units 2A and 2B (step S102 and step S202).

Then, when the communication connection between the controller unit 1 and each of the camera units 2A and 2B is established, each of the camera units 2A and 2B sends the controller unit 1 all shot image data through the first communication section 208*a* (step S203), and the partial image acquisition processing is ended.

On the other hand, the controller unit 1 acquires image data on a part (temporal part) corresponding to the log recorded on the recording medium 105*a* based on the all shot image data received from each of the camera units 2A and 2B through the first communication section 107*a* (step S103). Specifically, the controller unit 1 determines the kind of "edit-later" mode set at this time ("alternating acquisition" mode, "exclusive acquisition" mode, "continuous acquisition" mode, "dividing acquisition" mode, "nested acquisition" mode, or "extracting acquisition" mode), acquires the image data on the part (temporal part) corresponding to the content of the log (the kind of shooting instruction ("video shooting" or "still image shooting") and the "operation time" at which the user's operation related to this shooting instruction is performed) from the all shot image data received from each of the camera units 2A and 2B, and ends the partial image acquisition processing.

In the partial image acquisition processing of the embodiment, the all shot image data are sent from each of the camera units 2A and 2B to the controller unit 1 to acquire image data on the part (temporal part) corresponding to the log on the side of the controller unit 1, but the present invention is not limited thereto. An operation instruction of the movie button based on the log may be sent from the controller unit 1 so that each of the camera units 2A and 2B will send the controller unit 1 image data on the part (temporal part) corresponding to the log based on the received operation instruction, and the controller unit 1 will acquire a partial image. Further, the log may be sent from the controller unit 1 directly to each of the camera units 2A and 2B so that each of the camera units 2A and 2B will send the controller unit 1 image data on the part (temporal part) corresponding to the log based on the received log, and the controller unit 1 will acquire the partial image.

Further, in the partial image acquisition processing of the embodiment, the controller unit 1 acquires partial image data from each of the camera units 2A and 2B through communication connection, but the partial image data may be acquired through a storage medium instead of the communication connection.

As described above, the controller unit 1 that constitutes part of the multi-connection camera system 100 of the embodiment is to acquire instruction information (log) corresponding to the instruction information for acquiring the image, that is, the time information related to time at which the image is acquired. Further, the controller unit 1 is to acquire the image of the temporal part indicated by the time information corresponding to the instruction information from each of plural videos recorded continuously in terms of time, synchronized with the time information corresponding to the instruction information acquired, and different in content from each other.

Therefore, when the communication state between the controller unit 1 and each of the camera units 2A and 2B is unstable, the controller unit 1 prerecords the instruction information (log) for acquiring the image so that, when the communication connection between the controller unit 1 and each of the camera units 2A and 2B is established, the image of the temporal part indicated by time information corresponding to the instruction information can be acquired from each of the plural videos received from the camera units 2A and 2B, synchronized with the time information corresponding to the instruction information, and different in content from each other. Thus, the controller unit 1 can surely acquire the image of the part corresponding to the instruction from the video shot (all shot) with each of the camera units 2A and 2B regardless of the presence or absence of the communication connection with each of the camera units 2A and 2B, and the communication state.

Further, based on a difference between pieces of the time information corresponding to respective pieces of the instruction information (log), the controller unit 1 identifies the temporal part different among the plural videos, respectively, to acquire the image of the temporal part different among the plural videos, respectively, according to an identification result.

Therefore, since the image of an appropriately different temporal part can be acquired from each of the plural videos even when the user does not perform the instruction operation as to from which of the plural videos the image is to be acquired, operability upon acquisition of the image of the temporal part different among the plural videos, respectively, can be improved.

Further, based on a difference in temporal order of pieces of the time information corresponding to respective pieces of the instruction information (log), the controller unit 1 identifies the temporal part different among plural videos, respectively.

Therefore, based on the temporal order of the pieces of the time information corresponding to the respective pieces of the instruction information (log), since the image of the appropriately different temporal part can be acquired from each of the plural videos even when the user does not perform the instruction operation as to from which of the plural videos the image is to be acquired, the operability upon acquisition of the image of the temporal part different among the plural videos, respectively, can be improved.

Further, based on a difference in temporal length between pieces of the time information corresponding to respective pieces of the instruction information (log), the controller unit 1 identifies the temporal part different among the plural videos, respectively.

Therefore, based on the difference in the temporal length between the pieces of the time information corresponding to the respective pieces of the instruction information (log), since the image of the appropriately different temporal part can be acquired from each of the plural videos even when the user does not perform the instruction operation as to from which of the plural videos the image is to be acquired, the operability upon acquisition of the image of the temporal part different among the plural videos, respectively, can be improved.

Further, the controller unit 1 sets the instruction information (log) as instruction information on one video of the plural videos based on the difference between pieces of the time information corresponding to respective pieces of the instruction information to identify a temporal part identified in another video of the plural videos as being different from the temporal part identified in the one video. Further, according to the identification result, the controller unit 1 acquires, from the one video, the image of the temporal part indicated by the time information, and acquires, from another video, an image of the temporal part different from the temporal part identified in the one video.

Therefore, since the image of the appropriately different temporal part can be acquired from each of the plural videos merely by giving the shooting instruction on the one video of the plural videos even when the user does not perform the instruction operation as to from which of the plural videos the image is to be acquired, the operability upon acquisition of the image of the temporal part different among the plural videos, respectively, can be improved.

Further, since the controller unit 1 acquires an image of a temporal part from each of the plural videos synchronized with one another by plural imaging sections (the camera units 2A and 2B) and continuously shot in terms of time, a subject image at a desired angle can be acquired, for example, for each elapsed time.

Embodiment 2

Next, a multi-connection camera system 200 of Embodiment 2 will be described. Note that components similar to those in Embodiment 1 are given the same reference numerals to omit redundant description.

The multi-connection camera system 200 of Embodiment 2 features that the "direct shooting" mode and the "edit-later" mode described above are switched appropriately depending on the communication state between the controller unit 1 and each of the plural camera units 2, . . . .

In the following, the description will be made by focusing on the one camera unit 2A in the plural camera units 2, . . . and the controller unit 1.

FIG. 7A to FIG. 7E are timing charts indicative of image data acquisition patterns A to E according to the communication state between the controller unit 1 and the camera unit 2A. Note that each of the timing charts of FIG. 7A to FIG. 7E corresponds to each of the acquisition patterns A to E.

First, the acquisition pattern A will be described.

As illustrated in the acquisition pattern A of FIG. 7A, during a period between timings T100 and T103, where the communication connection between the controller unit 1 and the camera unit 2A (corresponding to the camera unit in FIG. 7A; the same hereinafter) is established, the "direct shooting" mode is set in the controller unit 1. Then, in the controller unit 1, for example, when the ON operation of the movie button is performed at timing T101 and the OFF operation of the movie button is performed at timing T102 during the period, the camera unit 2A performs shooting and recording only for a period of time (from timing T101 to timing T102) during which these operations are performed, and the controller unit 1 acquires image data shot and recorded during this time.

Then, at timing T103, when the communication connection between the controller unit 1 and the camera unit 2A is disconnected, the "edit-later" mode is set in the controller unit 1, and all shooting described above is automatically performed with the camera unit 2A. Further, in the camera unit 2A, disconnection-time state information indicating whether a state at timing T103 was a state during shooting or a state of being stopped is temporarily stored in the memory 102. Here, disconnection-time state information indicating that the state was the state of being stopped is temporarily stored. Then, in the controller unit 1, for example, when the ON operation of the movie button is performed at timing T105, and the OFF operation of the movie button is performed at timing T106, the operations are regarded as a shooting instruction, and recorded as a log on the recording medium 105a. like in Embodiment 1 described above, even in the embodiment, information indicative of a distinction between the ON operation and the OFF operation is not recorded. Then, in the controller unit 1, when the communication connection with the camera unit 2A is established, image data on a part (timing T105 to timing T106) corresponding to the log are acquired from all shot video.

Then, at timing T107, when the communication connection between the controller unit 1 and the camera unit 2A is established again, the "direct shooting" mode is set in the controller unit 1, and based on the disconnection-time state information stored in the memory 102, and the log recorded on the recording medium 105a of the controller unit 1, it is identified in the camera unit 2A as to whether the state is the state during shooting or the state of being stopped. Since the operation of the movie button is recorded in the log as a toggle type operation, even if the information indicative of the distinction between the ON operation and the OFF operation is not recorded, it can be identified whether the state at the time of starting the connection (timing T107) is the state during shooting or the state of being stopped from the disconnection-time state information stored in the memory 102, which indicates the start of recording the log, and the number of times the movie button is operated, which is recorded in the log. Here, in the case of the acquisition pattern A, since the disconnection-time state information stored in the memory 102 is information indicative of the state of being stopped, and the number of operations of the movie button recorded in the log is two, the last operation (timing T106) of the movie button is the OFF operation, and the state at timing T107 is identified as the state of being stopped. Therefore, in the camera unit 2A, the all shooting is ended at timing T107. Then, in the controller unit 1, for example, when the ON operation of the movie button is performed at timing T108 and the OFF operation of the movie button is performed at timing T109, the camera unit 2A performs shooting and recording only for a period of time (from timing T108 to timing T109) during which these operations are performed, and the controller unit 1 acquires image data shot and recorded during this time.

Next, the acquisition pattern B will be described.

As illustrated in the acquisition pattern B of FIG. 7B, during a period between timings T100 and T103, where the communication connection between the controller unit 1 and the camera unit 2A is established, the "direct shooting" mode is set in the controller unit 1. Then, during this period, for example, when the ON operation of the movie button is performed at timing T101 in the controller unit 1, the camera unit 2A becomes a state in which shooting and recording are started by using this operation as a trigger.

Then, at timing T103, when the communication connection between the controller unit 1 and the camera unit 2A is disconnected, the "edit-later" mode is set in the controller unit 1, and shooting and recording are continuously performed in the camera unit 2A. Further, in the camera unit 2A, the disconnection-time state information indicating whether the state at timing T103 was the state during shooting or the state of being stopped is temporarily stored in the memory 102. Then, in the controller unit 1, for example, when the OFF operation of the movie button is performed at timing T104, the ON operation of the movie button is performed at timing T105, and the OFF operation of the movie button is performed at timing T106, the operations are regarded as the shooting instruction, and recorded as the log on the recording medium 105a. Then, in the controller unit 1, when the communication connection with the camera unit 2A is established, image data on parts (timing T103 to timing T104, and timing T105 to timing T106) corresponding to the log are acquired from the all shot video.

Subsequently, at timing T107, when the communication connection between the controller unit 1 and the camera unit 2A is established again, the "direct shooting" mode is set in the controller unit 1, and based on the disconnection-time state information (the state during shooting) stored in the memory 102, and the log (the number of operations of the movie button is three) recorded on the recording medium 105a of the controller unit 1, it is identified in the camera unit 2A as to whether the state is the state during shooting or the state of being stopped. Here, in the case of the acquisition pattern B, since the disconnection-time state information stored in the memory 102 is information indicative of the state during shooting, and the number of operations of the movie button recorded in the log is three, the last operation (timing T106) of the movie button is the OFF operation, and the state at timing T107 is identified as the state of being stopped. Therefore, in the camera unit 2A, the all shooting is ended at timing T107. Then, in the controller unit 1, for example, when the ON operation of the movie button is performed at timing T108 and the OFF operation of the movie button is performed at timing T109, the camera unit 2A performs shooting and recording only for a period of time (from timing T108 to timing T109) during which these operations are performed, and the controller unit 1 acquires image data shot and recorded during this time.

Next, the acquisition pattern C will be described.

As illustrated in the acquisition pattern C of FIG. 7C, during a period between timings T100 and T103, where the communication connection between the controller unit 1 and the camera unit 2A is established, the "direct shooting" mode is set in the controller unit 1. Then, during this period, for example, when the ON operation of the movie button is performed at timing T101 in the controller unit 1, the camera unit 2A becomes a state in which shooting and recording are started by using this operation as a trigger.

Then, at timing T103, when the communication connection between the controller unit 1 and the camera unit 2A is disconnected, the "edit-later" mode is set in the controller unit 1, and shooting and recording are continuously performed in the camera unit 2A. Further, in the camera unit 2A, the disconnection-time state information indicating whether the state at timing T103 was the state during shooting or the state of being stopped is temporarily stored in the memory 102. Then, in the controller unit 1, for example, when the OFF operation of the movie button is performed at timing T104 and the ON operation of the movie button is performed at timing T105, the operations are regarded as the shooting instruction, and recorded as the log on the recording medium 105a. Then, in the controller unit 1, when the communication connection with the camera unit 2A is established, image data on parts (timing T103 to timing T104, and timing T105 to timing T107) corresponding to the log are acquired from the all shot video.

Subsequently, at timing T107, when the communication connection between the controller unit 1 and the camera unit 2A is established again, the "direct shooting" mode is set in the controller unit 1, and based on the disconnection-time state information (the state during shooting) stored in the memory 102, and the log (the number of operations of the movie button is two) recorded on the recording medium 105a of the controller unit 1, it is identified in the camera unit 2A as to whether the state is the state during shooting or the state of being stopped. Here, in the case of the acquisition pattern C, since the disconnection-time state information stored in the memory 102 is information indicative of the state during shooting, and the number of operations of the movie button recorded in the log is two, the last operation (timing T105) of the movie button is the ON operation, and the state at timing T107 is identified as the state during shooting. Therefore, the camera unit 2A continues to perform all shooting at timing T107. Then, in the controller unit 1, for example, when the OFF operation of the movie button is performed at timing T108, the ON operation of the movie button is performed at timing T109, and the OFF operation of the movie button is performed at timing T110, the camera unit 2A performs shooting and recording only for periods of time (from timing T107 to timing T108, and from timing T109 to timing T110) during which these operations are performed, and the controller unit 1 acquires image data shot and recorded during this time.

Next, the acquisition pattern D will be described.

As illustrated in the acquisition pattern D of FIG. 7D, during a period between timings T100 and T103, where the communication connection between the controller unit 1 and the camera unit 2A is established, the camera unit 2A will not perform shooting and recording if neither the ON operation nor the OFF operation of the movie button is performed in the controller unit 1.

Then, at timing T103, when the communication connection between the controller unit 1 and the camera unit 2A is disconnected, the "edit-later" mode is set in the controller unit 1, and the all shooting is automatically performed in the camera unit 2A. Further, in the camera unit 2A, the disconnection-time state information indicating whether the state at timing T103 was the state during shooting or the state of being stopped is temporarily stored in the memory 102. Then, in the controller unit 1, for example, when the ON operation of the movie button is performed at timing T104, the OFF operation of the movie button is performed at timing T105, and the ON operation of the movie button is performed at timing T106, the operations are regarded as the shooting instruction, and recorded as the log on the recording medium 105a. Then, in the controller unit 1, when the communication connection with the camera unit 2A is established, image data on parts (timing T104 to timing T105, and timing T106 to timing T107) corresponding to the log are acquired from the all shot video.

Subsequently, at timing T107, when the communication connection between the controller unit 1 and the camera unit 2A is established again, the "direct shooting" mode is set in the controller unit 1, and based on the disconnection-time state information (state of being stopped) stored in the memory 102, and the log (the number of operations of the movie button is three) recorded on the recording medium 105a of the controller unit 1, it is identified in the camera unit 2A as to whether the state is the state during shooting or the state of being stopped. Here, in the case of the acquisition pattern D, since the disconnection-time state information stored in the memory 102 is information indicative of the state of being stopped, and the number of operations of the movie button recorded in the log is three, the last operation (timing T106) of the movie button is the ON operation, and the state at timing T107 is identified as the state during shooting. Therefore, the camera unit 2A continues to perform the all shooting at timing T107. Then, in the controller unit 1, for example, when the OFF operation of the movie button is performed at timing T108, the ON operation of the movie button is performed at timing T109, and the OFF operation of the movie button is performed at timing T110, the camera unit 2A performs shooting and recording only for periods of time (from timing T107 to timing T108, and from timing T109 to timing T110) during which these operations are performed, and the controller unit 1 acquires image data shot and recorded during this time.

Next, the acquisition pattern E will be described.

As illustrated in the acquisition pattern E of FIG. 7E, during a period between timings T100 and T103, where the communication connection between the controller unit 1 and the camera unit 2A is established, the camera unit 2A will not perform shooting and recording if neither the ON operation nor the OFF operation of the movie button is performed in the controller unit 1 like in the acquisition pattern D.

Then, at timing T103, when the communication connection between the controller unit 1 and the camera unit 2A is disconnected, the "edit-later" mode is set in the controller unit 1, and the all shooting is automatically performed in the camera unit 2A. Further, in the camera unit 2A, the disconnection-time state information indicating whether the state at timing T103 was the state during shooting or the state of being stopped is temporarily stored in the memory 102. Then, in the controller unit 1, for example, when the ON operation of the movie button is performed at timing T104 and the OFF operation of the movie button is performed at timing T105, the operations are regarded as the shooting instruction, and recorded as the log on the recording medium 105a. Then, in the controller unit 1, when the communication connection with the camera unit 2A is established, image data on a part (timing T104 to timing T105) corresponding to the log are acquired from the all shot video.

In the embodiment, the controller unit 1 records the log only when the state of communication with the camera unit 2A is disconnected, but the controller unit 1 may also record the log during connection. In this case, when the partial image acquisition processing is performed, the image data shot in association with the "direct shooting" performed during connection, and the image data acquired from the all shot image data by "editing later" during disconnection can be collectively acquired by the "editing later."

Subsequently, at timing T107, when the communication connection between the controller unit 1 and the camera unit 2A is established again, the "direct shooting" mode is set in the controller unit 1, and based on the disconnection-time state information (state of being stopped) stored in the memory 102, and the log (the number of operations of the movie button is two) recorded on the recording medium 105a of the controller unit 1, it is identified in the camera unit 2A as to whether the state is the state during shooting or the state of being stopped. Here, in the case of the acquisition pattern E, since the disconnection-time state information stored in the memory 102 is information indicative of the state of being stopped, and the number of operations of the movie button recorded in the log is two, the last operation (timing T105) of the movie button is the OFF operation, and the state at timing T107 is identified as the state of being stopped. Therefore, the all shooting in the camera unit 2A is ended at timing T107. Then, in the controller unit 1, for example, when the ON operation of the movie button is performed at timing T108 and the OFF operation of the movie button is performed at timing T109, the camera unit 2A performs shooting and recording only for a period of time (from timing T108 to timing T109) during which these operations are performed, and the controller unit 1 acquires image data shot and recorded during this time.

In the embodiment, only the video shooting instruction with the operations of the movie button is described, but the embodiment may also be applied to the still image shooting with the operation of the release button like in Embodiment 1.

As described above, the multi-connection camera system 200 of the embodiment includes the controller unit 1 and the plural camera units 2A and 2B. Each of the plural camera units 2A and 2B controls the video shooting by the imaging section 203 according to the shooting instruction information received from the controller unit 1 through communication, and detects the state of communication with the controller unit 1 to control the imaging section 203 to perform the video shooting continuously while the communication state is being detected to be the disconnected state regardless of the shooting instruction information from the controller unit 1. Further, each of the plural camera units 2A and 2B acquires, after the connection, the shooting instruction information that has not been received while the communication state is being detected to be the disconnected state to identify the temporal part corresponding to the shooting instruction information from the video shot by the imaging section 203 while the communication state is being detected to be the disconnected state. Further, the controller unit 1 acquires, from each of the plural camera units 2A and 2B, the image of the temporal part corresponding to the shooting instruction information identified by each of the plural camera units 2A and 2B.

Therefore, even when the state of communication with each of the camera units 2A and 2B is changed, the controller unit 1 can surely acquire the image of the part according to the instruction from the video shot (all shot) with each of the camera units 2A and 2B.

Further, according to the multi-connection camera system 200 of the embodiment, since the shooting instruction information sent from the controller unit 1 is associated with the time information related to the time, and the imaging control section 204 in each of the camera units 2A and 2B controls shooting in synchronization with the controller unit 1, the image of the part according to the instruction can be surely acquired from the video shot (all shot) with each of the camera units 2A and 2B.

Further, according to the multi-connection camera system 200 of the embodiment, when the communication state to be detected is changed from the disconnected state to the connected state, each of the plural camera units 2A and 2B identifies whether the state is the state during shooting or the state of being stopped while the communication state continues the connected state. Then, when the state during shooting is identified, the imaging section 203 is controlled to maintain the state during shooting, while when the state of being stopped is identified, the imaging section 203 is controlled to stop shooting.

Thus, when the communication state is changed from the disconnected state to the connected state, if the state is identified as the state of being stopped, power consumption can be reduced by stopping shooting with each of the plural camera units 2A and 2B.

Further, according to the multi-connection camera system 200 of the embodiment, when the communication state is changed from the connected state to the disconnected state, each of the plural camera units 2A and 2B stores the disconnection-time state information indicating whether the state is the state during shooting or the state of being stopped. Then, when the communication state is changed from the disconnected state to the connected state, it is identified, based on the stored disconnection-time state information and the shooting instruction information sent from the controller unit 1, whether the state is the state during shooting or the state of being stopped while the communication state continues the state of being connected so that, when the communication state between the controller unit 1 and each of the plural camera units 2A and 2B is changed from the disconnected state to the connected state, it can be surely identified whether each of the camera units 2A and 2B is in the state during shooting or the state of being stopped.

Note that the present invention is not limited to each of the embodiments, and various improvements and design changes may be made without departing from the spirit of the present invention.

For example, although two camera units 2A and 2B are illustrated in the embodiments as the plural camera units 2, ..., the present invention is not limited thereto. The number of camera unit 2, ... is not limited to two, and it may be three or more.

Further, in each of the embodiments, in the case where any of the "continuous acquisition" mode, the "dividing acquisition" mode, the "nested acquisition" mode, and the "extracting acquisition" mode is set as the "edit-later" mode, when image data on a part corresponding to the log are acquired from the video all shot with each of the camera units 2A and 2B, the image data may be so acquired that image data respectively from the camera units 2A and 2B will overlap each other in terms of time.

Further, in each of the embodiments, the log used to acquire image data on the part corresponding to the log from the video all shot with each of the camera units 2A and 2B is not limited to the shooting instruction from the controller unit 1, and it may be a log related to a shooting instruction from another controller unit different from the controller unit 1.

Further, in each of the embodiments, the log is composed of the information indicative of the kind of the shooting instruction and the time information indicative of the time at which the user's operation related to the shooting instruction is performed. However, when the log target is only the video shooting, only the time information at which the user's operation related to the video shooting instruction is performed may be used.

Note that the present invention can not only be provided as the image acquisition device, the image acquisition system, and the imaging device, which have the configuration prepared for implementing the functions according to the present invention, but also can be applied to a program to cause an existing information processing apparatus or the like to function as the image acquisition device, the image acquisition system, and the imaging device according to the present invention. In other words, the program that implements each of the functional configurations of the image acquisition device 1, the image acquisition systems 100, 200, and the imaging device 2 illustrated in the embodiments is so applied that a CPU or the like that controls the existing information processing apparatus or the like can execute the program and that the existing information processing apparatus or the like can function as each of the image acquisition device, the image acquisition system, and the imaging device according to the present invention.

The method of applying such the program is optional. For example, the program can be stored on a computer-readable storage medium, such as a flexible disk, a CD (Compact Disc)-ROM, a DVD (Digital Versatile Disc)-ROM, or a memory card, and applied. Further, the program can also be superimposed on a carrier wave, and applied through a communication medium such as the Internet. For example, the program may be posted to a bulletin board system (BBS) on a communication network, and delivered. Then, the existing information processing apparatus may be configured to start and execute this program in the same manner as other application programs under the control of an OS (Operating System) in order to be able to perform processing.

While the embodiments of the present invention have been described, the scope of the present invention is not limited to the above-described embodiments, and the scope equivalent to the scope of appended claims should be included.

What is claimed is:

1. An image acquisition device comprising:
an acquisition section; and
a controller configured to:
  acquire, as instruction information, time information indicating a time at which a shooting instruction operation is performed by a user;
  acquire, by the acquisition section, a plurality of videos which are continuous in terms of time and different in content from one another, each of the plurality of videos being acquired from a respective one of a plurality of imaging sections, the plurality of videos being synchronized with one another, and each of the plurality of videos having been compressed and coded in a memory by its respective imaging section; and
  acquire an image of a temporal part at the time indicated by the time information corresponding to the acquired instruction information, from each of the plurality of videos which are synchronized with one another and captured by the plurality of imaging sections and shot continuously in terms of time,
wherein each of the plurality of imaging sections is included in a different housing body, and
wherein the controller is configured to:
  determine whether a plurality of the housing bodies are integrated, and
  according to a result of the determination regarding the integration of the plurality of the housing bodies, perform control to set an image acquisition mode by which the image of the temporal part is acquired from each of the plurality of videos.

2. The image acquisition device according to claim 1, wherein the controller is configured to:
  identify a temporal part different among the plurality of videos based on a difference among pieces of the time information corresponding to respective pieces of the instruction information, and acquire an image of the temporal part different among the plurality of videos according to a result of the identification.

3. The image acquisition device according to claim 2, wherein the controller identifies the temporal part different among the plurality of videos based on a difference in temporal order of the pieces of the time information corresponding to the respective pieces of the instruction information.

4. The image acquisition device according to claim 2, wherein the controller identifies the temporal part different among the plurality of videos based on a difference in temporal length among the pieces of the time information corresponding to the respective pieces of the instruction information.

5. The image acquisition device according to claim 2, wherein:
the instruction information comprises instruction information pertaining to one video among the plurality of videos, and
the controller is configured to:
identify, based on the difference among the pieces of the time information corresponding to the respective pieces of the instruction information, a temporal part identified in another video among the plurality of videos, which is different from a temporal part identified in the one video, and
according to a result of the identification, acquire an image of a temporal part indicated by the time information corresponding to the instruction information, from the one video, and acquire, from another video, an image of a temporal part different from the temporal part identified in the one video.

6. The image acquisition device according to claim 1, wherein:
when it is determined that the housing bodies are integrated, the controller acquires an image of an identical temporal part from each of the plurality of videos, and
when it is determined that the housing bodies are not integrated, the controller acquires an image of a different temporal part from each of the plurality of videos.

7. The image acquisition device according to claim 1, wherein the shooting instruction operation is a release button operation.

8. The image acquisition device according to claim 1, wherein the image of the temporal part is a frame image.

9. An image acquisition method, comprising:
acquiring, as instruction information, time information indicating a time at which a shooting instruction operation is performed by a user;
acquiring a plurality of videos which are continuous in terms of time and different in content from one another, each of the plurality of videos being acquired from a respective one of a plurality of imaging sections, the plurality of videos being synchronized with one another, and each of the plurality of videos having been compressed and coded in a memory by its respective imaging section; and
acquiring an image of a temporal part at the time indicated by the time information corresponding to the acquired instruction information, from each of the plurality of videos which are synchronized with one another and captured by the plurality of imaging sections and shot continuously in terms of time,
wherein each of the plurality of imaging sections is included in a different housing body, and
wherein the method further comprises:
determining whether a plurality of the housing bodies are integrated, and
according to a result of the determination regarding the integration of the plurality of the housing bodies, performing control to set an image acquisition mode by which the image of the temporal part is acquired from each of the plurality of videos.

10. A non-transitory computer-readable recording medium having a program stored thereon, the program causing a computer to implement functions comprising:
acquiring, as instruction information, time information indicating a time at which a shooting instruction operation is performed by a user;
acquiring a plurality of videos which are continuous in terms of time and different in content from one another, each of the plurality of videos being acquired from a respective one of a plurality of imaging sections, the plurality of videos being synchronized with one another, and each of the plurality of videos having been compressed and coded in a memory by its respective imaging section; and
acquiring an image of a temporal part at the time indicated by the time information corresponding to the acquired instruction information, from each of the plurality of videos which are synchronized with one another and captured by the plurality of imaging sections and shot continuously in terms of time,
wherein each of the plurality of imaging sections is included in a different housing body, and
wherein the functions further comprise:
determining whether a plurality of the housing bodies are integrated, and
according to a result of the determination regarding the integration of the plurality of the housing bodies, performing control to set an image acquisition mode by which the image of the temporal part is acquired from each of the plurality of videos.

11. An image acquisition system including an image acquisition device and a plurality of imaging devices having respective housing bodies,
wherein the image acquisition device comprises:
an acquisition section; and
a controller configured to acquire, as instruction information, time information indicating a time at which a shooting instruction operation is performed by a user,
wherein each of the plurality of imaging devices comprises:
an imaging section;
a communication section;
a memory; and
a control section configured to send, via the communication section, a video which is captured by the imaging section, compressed and coded, and recorded in the memory, and
wherein the controller is further configured to:
acquire, from the plurality of imaging devices via the acquisition section, a plurality of videos which are continuous in terms of time and different in content from one another and which are synchronized with one another;
acquire an image of a temporal part at the time indicated by the time information corresponding to the acquired instruction information, from each of the plurality of videos which are synchronized with one another and captured by the plurality of imaging devices and shot continuously in terms of time;
determine whether a plurality of the housing bodies of the plurality of imaging devices are integrated, and according to a result of the determination regarding the integration of the plurality of the housing bodies, perform control to set an image acquisition mode by which the image of the temporal part is acquired from each of the plurality of videos.

* * * * *